United States Patent [19]

Shiga

[11] Patent Number: 5,642,504
[45] Date of Patent: Jun. 24, 1997

[54] METHOD OF TESTING AN APPLICATION ON A SERVER WHICH ACCESSES A DATABASE

[75] Inventor: Koichi Shiga, Kawasaki, Japan

[73] Assignee: Fujitsu Limited, Kawasaki, Japan

[21] Appl. No.: 501,276

[22] Filed: Jul. 17, 1995

Related U.S. Application Data

[63] Continuation of Ser. No. 112,130, Aug. 26, 1993, abandoned.

[30] Foreign Application Priority Data

Dec. 18, 1992 [JP] Japan ..................... 4-339099

[51] Int. Cl.$^6$ .................. G06F 17/30; G06F 15/00
[52] U.S. Cl. ............... 395/610; 395/617; 395/618; 395/200.03; 395/183.09; 364/DIG. 1; 364/282.1; 364/284.4; 364/285.4
[58] Field of Search ..................... 395/600, 610, 395/617, 618, 200.03, 183.09; 364/DIG. 1

[56] References Cited

U.S. PATENT DOCUMENTS

| | | | |
|---|---|---|---|
| 4,881,166 | 11/1989 | Thompson et al. | 364/200 |
| 5,138,712 | 8/1992 | Corbin | 395/700 |
| 5,157,779 | 10/1992 | Washburn et al. | 395/575 |
| 5,164,912 | 11/1992 | Osborne et al. | 364/580 |
| 5,287,103 | 2/1994 | Kasprzyk et al. | 340/825.52 |
| 5,303,166 | 4/1994 | Amalfitano et al. | 364/551.01 |
| 5,347,518 | 9/1994 | Lee | 371/19 |

FOREIGN PATENT DOCUMENTS

| | | |
|---|---|---|
| 61-188646 | 8/1986 | Japan. |
| 4-112344 | 4/1992 | Japan. |

Primary Examiner—Thomas G. Black
Assistant Examiner—Jean R. Homere
Attorney, Agent, or Firm—Staas & Halsey

[57] ABSTRACT

An application testing method is used to test a first application which is written in a language which makes reference to and updates a database. The application testing method includes the steps of (a) giving test data to the first application by a capacity of a second application which issues a request, and (b) invalidating updating of the database made by the first application by a communication process which links to a transaction monitor or a database management system.

11 Claims, 9 Drawing Sheets

FIG. 5A

```
client  cltname  = COMMUNICATION PROCESS NAME
        service  = TESTED APPLICATION NAME
        conv     = COMMUNICATION FORMAT
        infile   = FULL PATH NAME OF TEST DATA STORAGE
                   FILE
        outlife  = FULL PATH NAME OF LOGGING FILE OF
                   TEST RESULT
        bufsize  = BUFFER SIZE
        tran     = SPECIFY WHETHER TO ABORT OR COMMIT
                   TRANSACTION
```

```
data  = SEND DATA  ⎫
data  = SEND DATA  ⎪
recv               ⎬  1 TRANSACTION
data  = SEND DATA  ⎪
recv               ⎪
end                ⎭
```

FIG. 5B

METHOD OF TESTING AN APPLICATION ON A SERVER WHICH ACCESSES A DATABASE

This application is a continuation of application Ser. No. 08/112,130, filed Aug. 26, 1993, now abandoned.

BACKGROUND OF THE INVENTION

The present invention generally relates to application testing methods, and more particularly to a server application testing method for testing a server application which makes an access to a database.

Test items of a server application which makes a distributed transaction may be generally categorized into the following two items.
1) A calling interface between a client application and the server application; and
2) A database referring and updating process.

According to the conventional test support function, the test could be made with respect to the test item 1), but there was no function of testing the test item 2).

For this reason, in order to make the test with respect to the test item 2) above, a testing client application 11b and a tested server application 12b are provided within a server machine 10 as shown in FIG. 1 in addition to a client application 11a and a server application 12a which are operational. A database processing instruction (SQL) which is issued by the server application 12a refers to and updates a practical database 15 by a database management system (DBMS) 14. On the other hand, a database processing instruction (SQL) issued by the tested server application 12b refers to and updates a testing database 16 by the DBMS 14.

Conventionally, in order to test the server application 12a, a syntax check of the database processing instruction (SQL) issued by the tested server application 12b must be carried out via the DBMS 14. Hence, in order to prevent the practical database 15 from being updated by the execution of the tested server application 12b, it was necessary to make the testing client application 11b and the testing database 16 for each test of the server application 12a. As a result, there was a problem in that the test efficiency of the conventional server application testing method is poor.

SUMMARY OF THE INVENTION

Accordingly, it is a general object of the present invention to provide a novel and useful application testing method in which the problem described above is eliminated.

Another and more specific object of the present invention is to provide an application testing method for testing a first application which is written in a language which makes reference to and updates a database, comprising the steps of (a) giving test data to the first application by a capacity of a second application which issues a request, and (b) invalidating updating of the database made by the first application by a communication process which links to a transaction monitor or a database management system. According to the application testing method of the present invention, it is possible to test the first application without the need to provide a testing database. In other words, since the updating of the database that is made when the first application is tested is invalidated by the communication process, it is possible to use the practical database for the testing, without the need to provide the testing database. In addition, because the communication process can be generated automatically by a main process, the creator of the first application does not need to prepare a testing client application.

Other objects and further features of the present invention will be apparent from the following detailed description when read in conjunction with the accompanying drawings.

BRIEF DESCRIPTION OF THE DRAWINGS

FIG. 5(A) and 5(B) are diagrams showing the contents of an environment definition file and test data;

DESCRIPTION OF THE PREFERRED EMBODIMENTS

Figure 2:
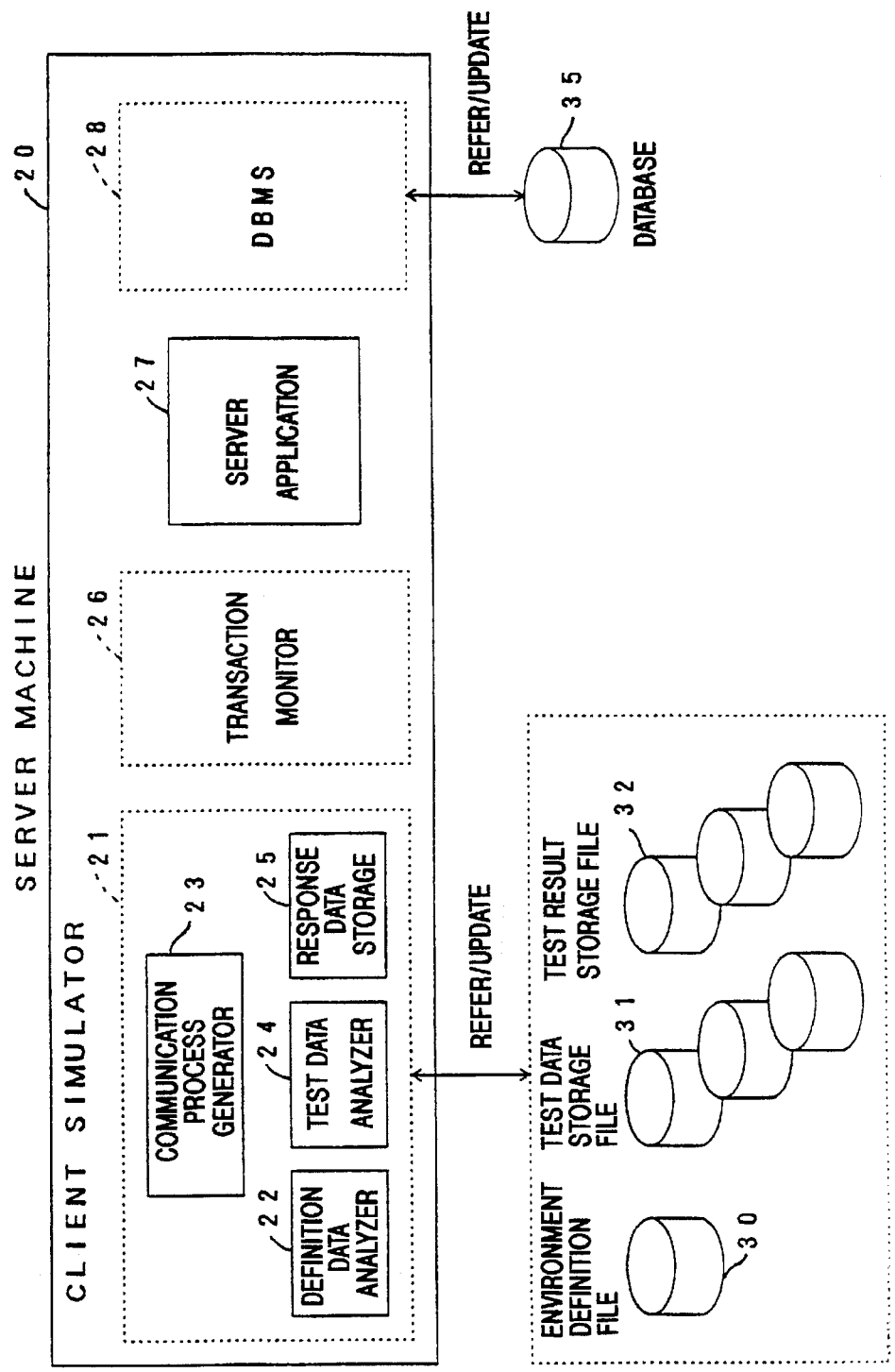
FIG. 2 is a system block diagram for explaining the functions of a server machine.
Figure 3:
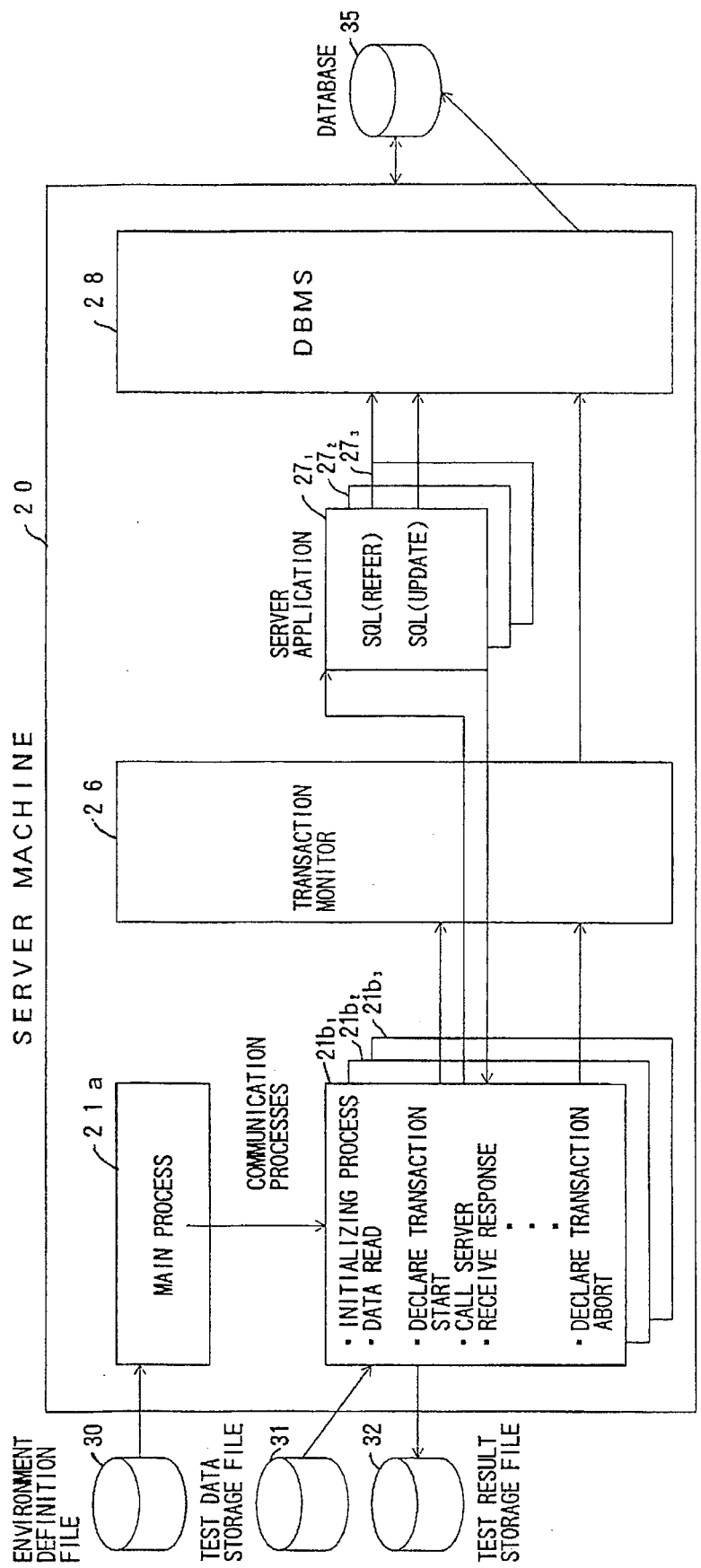
FIG. 3 is a system block diagram for explaining a first embodiment of an application testing method according to the present invention.

FIG. 2 is a system block diagram for explaining the functions of a server machine, and FIG. 3 is a system block diagram for explaining a first embodiment of an application testing method according to the present invention.

In FIG. 2, a server machine 20 is provided with a client simulator 21 for simulating a client application. The client simulator 21 includes a definition data analyzer 22 for reading an environment definition file 30 and analyzing definition data, a communication process generator 23 for generating a communication process depending on the analysis result obtained by the definition data analyzer 22, a test data analyzer 24 for analyzing test data read from a test data storage file 31 by the communication process, and a response data storage 25 for writing to a test result storage file 32 a response message which is obtained from a tested server application 27 by carrying out a test.

A transaction monitor 26 manages and controls transactions which are controlled by a database management system (DBMS) 28 as local transactions. A server application 27 which is to be tested issues a data processing instruction (SQL) to the DBMS 28 and makes a reference to and updates contents of a practical database 35.

The DBMS 28 has a provisional updating function for provisionally updating the database 35 prior to the actual updating. After the provisional updating, the DBMS 28 makes the actual updating in response to a commit instruction from the transaction monitor 26, and invalidates the provisional updating in response to an abort instruction.

A main process 21a shown in FIG. 3 corresponds to the definition data analyzer 22 and the communication process generator 23 shown in FIG. 2. In addition, communication processes $21b_1$ through $21b_3$ shown in FIG. 3 correspond to the test data analyzer 24 and the response data storage 25 shown in FIG. 2.

Figure 4:
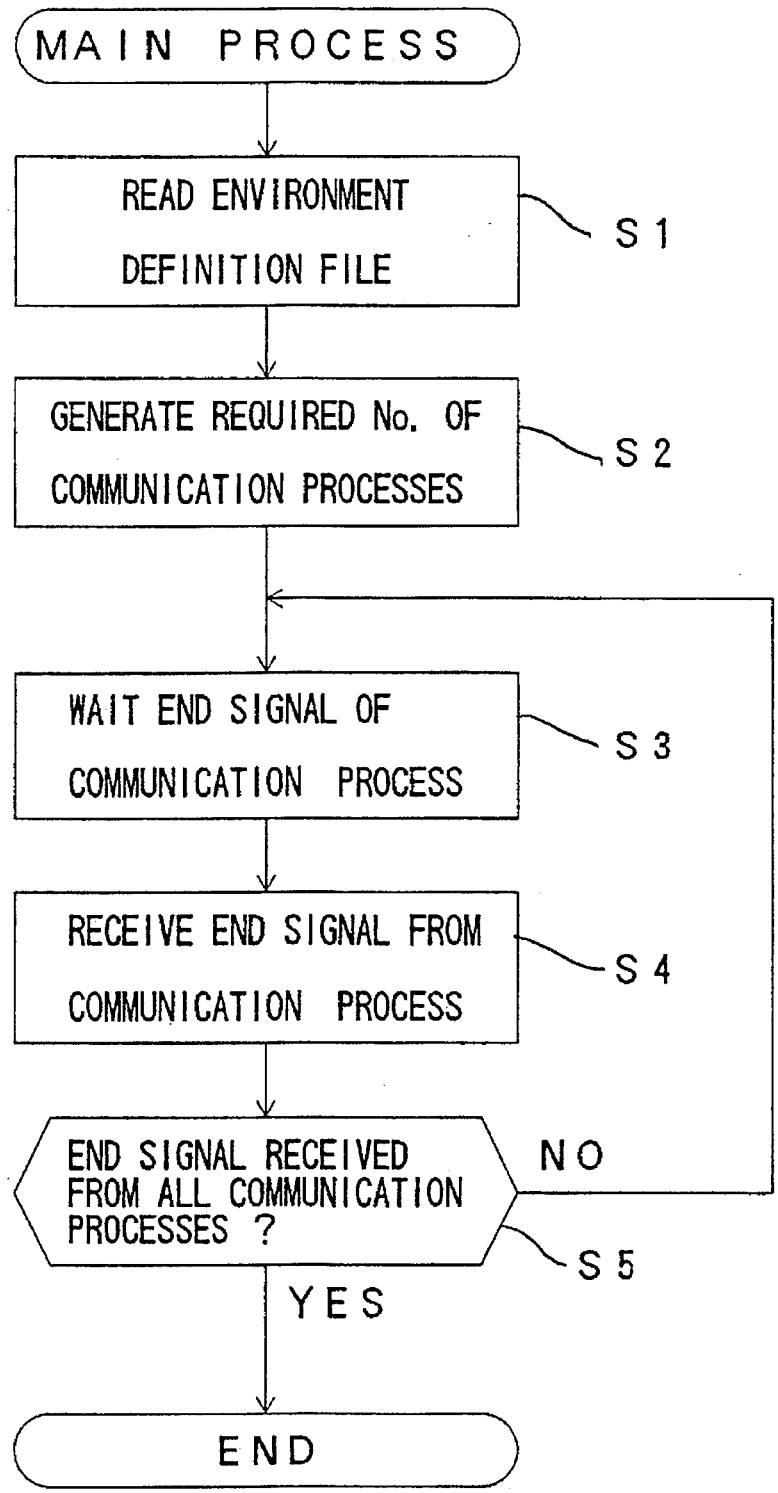
FIG. 4 is a flow chart for explaining a main process.

The main process 21a is started in response to a command which starts the client simulator 21, and carries out a process shown in FIG. 4.

In FIG. 4, a step S1 reads the definition data from the environment definition file 30 which is specified by an operand of a start command. As shown in FIG. 5 (A), the environment definition file 30 stores the definition data related to the operating environment and the operating conditions. A first row of the environment definition file 30 shown in FIG. 5 (A) specifies a communication process name. A second row of the environment definition file 30 specifies a tested server application name, and a third row of the environment definition file 30 specifies a communication format such as a procedure of giving an immediate answer to each question and a series of questions and answers. A fourth row of the environment definition file 30 specifies a full path name of a test data storage file which is made by the user, and a fifth row of the environment definition file 30 specifies a full path name of a test result file which makes a logging of the test result. A sixth row of the environment definition file 30 specifies a kind of buffer and a buffer size which are required by the transaction monitor 26, and a seventh row of the environment definition file 30 specifies whether to abort or commit the transaction.

The various specifications (or specifying operations) described above are repeated for a number of tested server applications which are to be tested.

Returning now to the description of the main process shown in FIG. 4, a step S2 generates a required number of communication processes $21b_1$ through $21b_3$ and the like depending on the specification made by the environment definition file 30. In this state, the main process notifies each of the communication processes $21b_1$ through $21b_3$ of the various specifications made by the environment definition file 30 such as the buffer size and the test data storage file name to be referred by each of the communication processes $21b_1$ through $21b_3$.

Thereafter, a step S3 of the main process waits for an end signal from each of the communication processes $21b_1$ through $21b_3$, and a step S4 receives this end signal from the communication processes $21b_1$ through $21b_3$. Then, a step S5 decides whether or not the end signal has been received from all of the communication processes $21b_1$ through $21b_3$. The process returns to the step S3 if the decision result in the step S5 is NO, so as to repeat the steps S3 through S5. On the other hand, the process ends if the decision result in the step S5 is YES.

Figure 6:
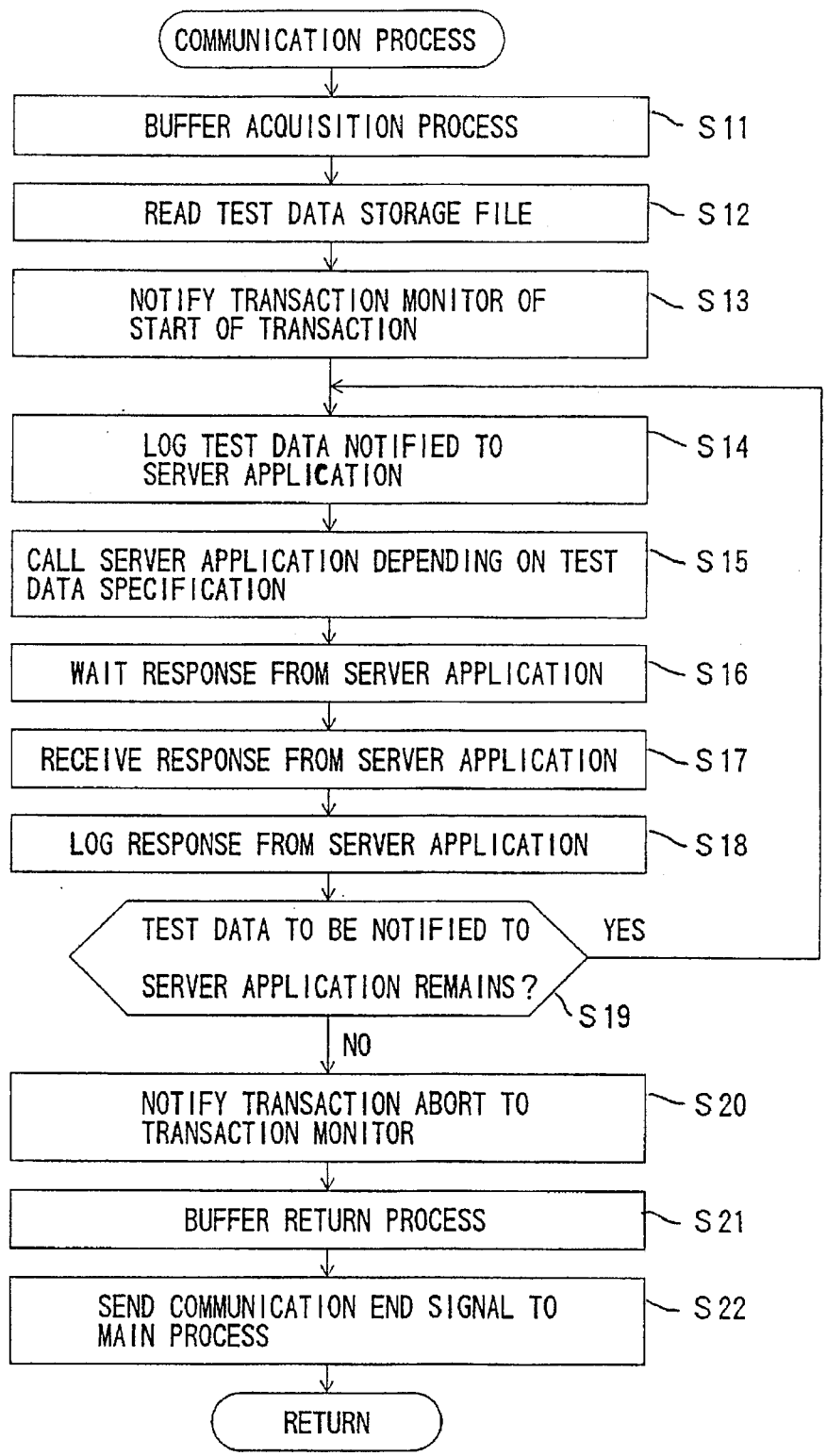
FIG. 6 is a flow chart for explaining a communication process.

FIG. 6 is a flow chart for explaining a 10 process which is carried out by each of the communication processes $21b_1$ through $21b_3$. In FIG. 6, a step S11 carries out an initial process such as requesting buffer acquisition to the transaction monitor 26. A step S12 reads the test data storage file 31 notified by the main process 21a. This test data storage file 31 stores test data in transaction units as shown in FIG. 5 (B). In FIG. 5 (B), first, second and fourth rows respectively specify a notification message to be notified to the server application which is to be tested. Third and fifth rows in FIG. 5 (B) respectively specify the reception of the response messages with respect to the notification messages of the second and fourth rows. A sixth row in FIG. 5 (B) specifies the end of the transaction.

A step S13 shown in FIG. 6 notifies the transaction monitor 26 of a start of the transaction. Then, a step S14 makes a logging of the notification messages which are notified to tested server applications $27_1$ through $27_3$ into the test result storage file 32. A step S15 calls the tested server applications $27_1$ through $27_3$ based on the test data read from the test data storage file 31. Accordingly, the called server applications $27_1$ through $27_3$ issue the data processing instructions (SQLs) to the DBMS 28 to make reference to and update the database 35.

Next, a step S16 waits for the response from the server applications $27_1$ through $27_3$, and a step S17 receives the response from the server applications $27_1$ through $27_3$. A step S18 makes a logging of the received response message into the test result file 32. Thereafter, a step S19 decides whether or not there remains a test data to be notified to the server applications $27_1$ through $27_3$. The process returns to the step S14 and the steps S14 through S19 are repeated if the decision result in the step S19 is YES.

On the other hand, if the decision result in the step S19 is NO, a step S20 declares abort of the transaction to the transaction monitor 26. As a result, the transaction monitor 26 instructs roll-back of the database 35 to the DBMS 28, and the DBMS 28 restores the data of the database 35 being processed to the state before the updating.

A step S21 returns to the transaction monitor 26 the buffer for which the acquisition request was made. A step S22 notifies the main process 21a of the end of the communication process by sending an end signal, and the process ends.

Therefore, the updating of the database 35 that was made when testing the server applications $27_1$ through $27_3$ by carrying out the communication processes $21b_1$ through $21b_3$ is invalidated by the abort declaration. For this reason, the contents of the database 35 will not be changed by the test which is carried out, and it is possible to use the practical database 35, without the need to provide a testing database for use in the testing the server applications $27_1$ through $27_3$.

In addition, because the communication processes $27_1$ through $27_3$ are generated automatically by the main process 21a, the creator of the server application does not need to make a client application, and the test can be carried out without the knowledge of the transaction instruction of the client application. Furthermore, the testing of the plurality of server applications $27_1$ through $27_3$ can be carried out time-sequentially.

Figure 7:
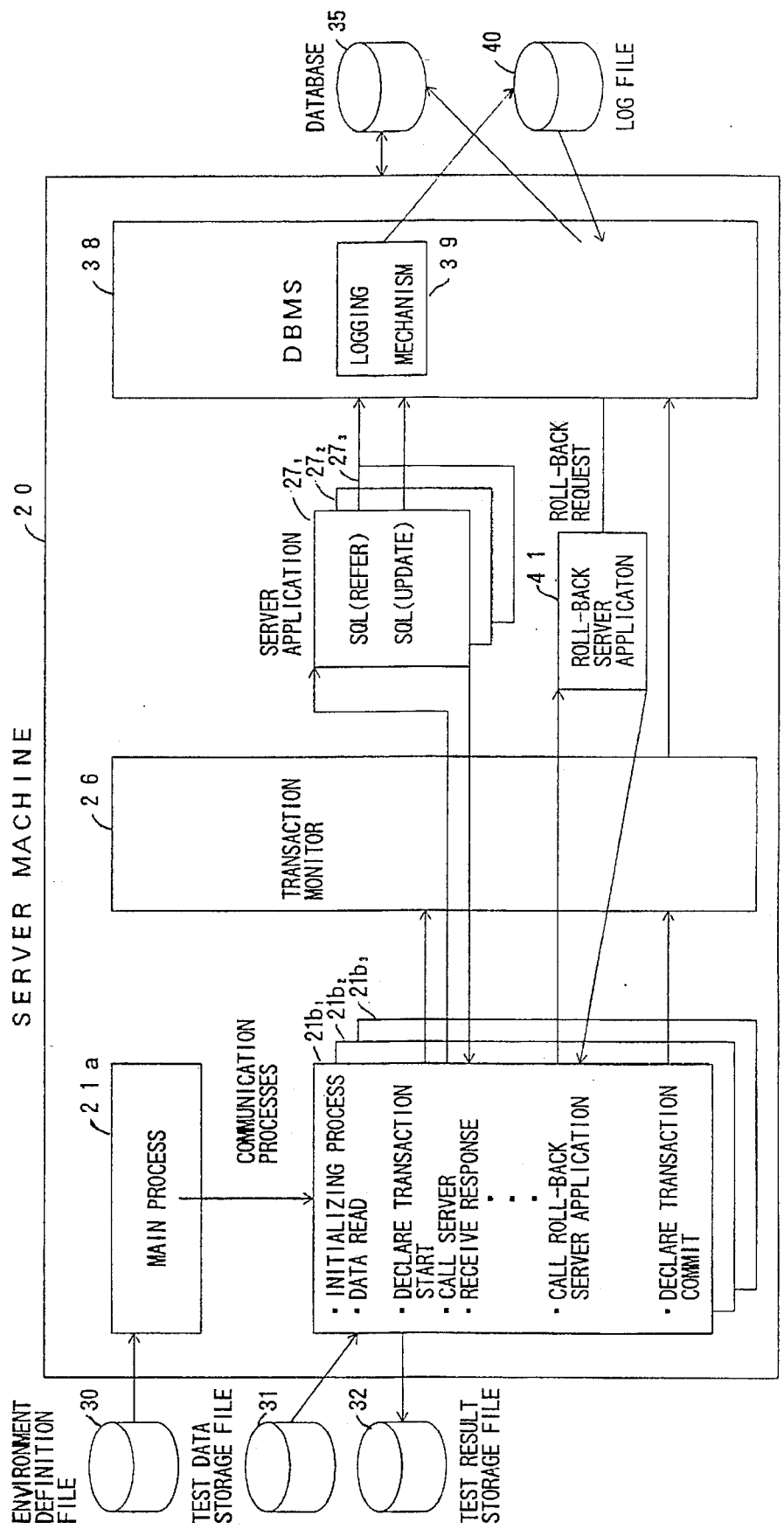
FIG. 7 is a system block diagram for explaining a second embodiment of the application testing method according to the present invention.

FIG. 7 is a system block diagram for explaining a second embodiment of the application testing method according to the present invention. In FIG. 7, those parts which are the same as those corresponding parts in FIG. 3 are designated by the same reference numerals, and a description thereof will be omitted.

Figure 8:
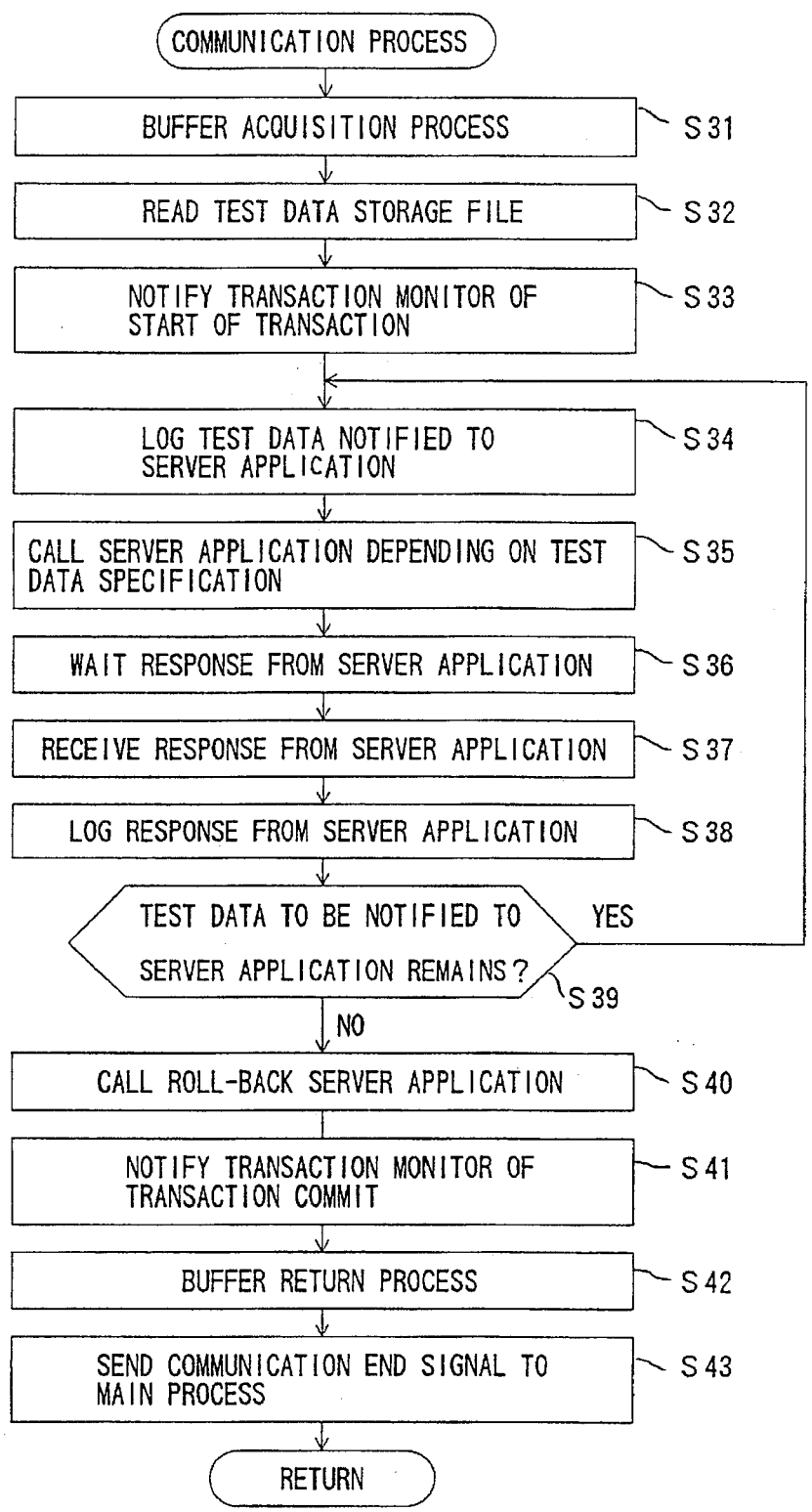
FIG. 8 is a flow chart for explaining a communication process.

In FIG. 8, a DBMS 38 within the server machine 20 does not have the provisional updating function. Instead, the DBMS 38 has a logging mechanism 39 for making into a log file 40 a logging of a before-update-log which is related to the access with respect to the database 35 before the updating. This logging mechanism 39 also reads the before-update-log and a logic log from the log file 40 in server application units. In addition, a roll-back server application 41 is provided in the server machine 20 to restore the contents of the database 35 to the contents before the updating by use of the logging mechanism 39.

The before-update-log stores the contents of the database 35 before the server application is updated in the updated sequence. For example, if the server application changes a content a1 of the database 35 to b1 and a content a2 of the database 35 to b2, the contents a1 and a2 are stored in the log file 40 as the before-update-log. Accordingly, the contents of the database 35 are restored to the state before the updating by writing back (that is, restoring) the contents a2 and a1 in this sequence.

In this case, the main process 21a calls the roll-back server application 41 after receiving the response from the communication processes $21b_1$ through $21b_3$ using the tested server application name as the parameter. In addition, the main process 21a generates communication processes $21c_1$ through $21c_3$ for making the transaction commit declaration in place of the transaction abort declaration.

FIG. 8 is a flow chart for explaining a process carried out by each of the communication processes $27c_1$ through $27c_3$. In FIG. 8, a step S31 carries out an initializing process such as requesting buffer acquisition to the transaction monitor 26. A step S32 reads the test data storage file 31 which is notified from the main process 21a.

A step S33 shown in FIG. 8 notifies the transaction monitor 26 of a start of the transaction. Then, a step S34 makes a logging of the test data which are notified to the tested server applications $27_1$ through $27_3$ into the test result storage file 32. A step S35 calls the tested server applications $27_1$ through $27_3$ based on the test data read from the test data storage file 31. Accordingly, the called server applications $27_1$ through $27_3$ issue the data processing instructions (SQLs) to the DBMS 38 to make reference to and update the database 35. In this state, the before-update-log is written into the log file 40.

Next, a step S36 waits for the response from the server applications $27_1$ through $27_3$, and a step S37 receives the response from the server applications $27_1$ through $27_3$. A step S38 makes a logging of the received response message into the test result file 32. Thereafter, a step S39 decides whether or not there remains a test data to be notified to the server applications $27_1$ through $27_3$. The process returns to the step S34 and the steps S34 through S39 are repeated if the decision result in the step S39 is YES.

On the other hand, if the decision result in the step S39 is NO, a step S40 calls the roll-back server application 41. In this state, the name of the server application which is tested by the communication process is notified by the parameter. As a result, the roll-back server application 41 issues a roll-back request to the DBMS 28 for the tested server application, and the logging mechanism 39 restores the database 35 by reading the before-update-log of the tested server application which is specified from the log file 40.

Thereafter, a step S41 makes a transaction commit declaration with respect to the transaction monitor 26. Hence, the transaction monitor 26 instructs definiteness of the database 35 to the DBMS 38, and the DBMS 38 makes the contents of the database 35 definite.

A step S42 returns to the transaction monitor 26 the buffer for which the acquisition request was made. A step S43 notifies the main process 21a of the end of the communication process by sending an end signal, and the process ends.

Therefore, even if the DBMS 38 does not have the provisional updating function, the updating of the database 35 that was made when testing the server applications $27_1$ through $27_3$ by carrying out the communication processes $21b_1$ through $21b_3$ can be invalidated after the test ends, similarly to the first embodiment, by providing the log file 40 and the roll-back server application 41. For this reason, the contents of the database 35 will not be changed by the test which is carried out, and it is possible to use the practical database 35, without the need to provide a testing database for use in the testing the server applications $27_1$ through $27_3$.

Figure 9:
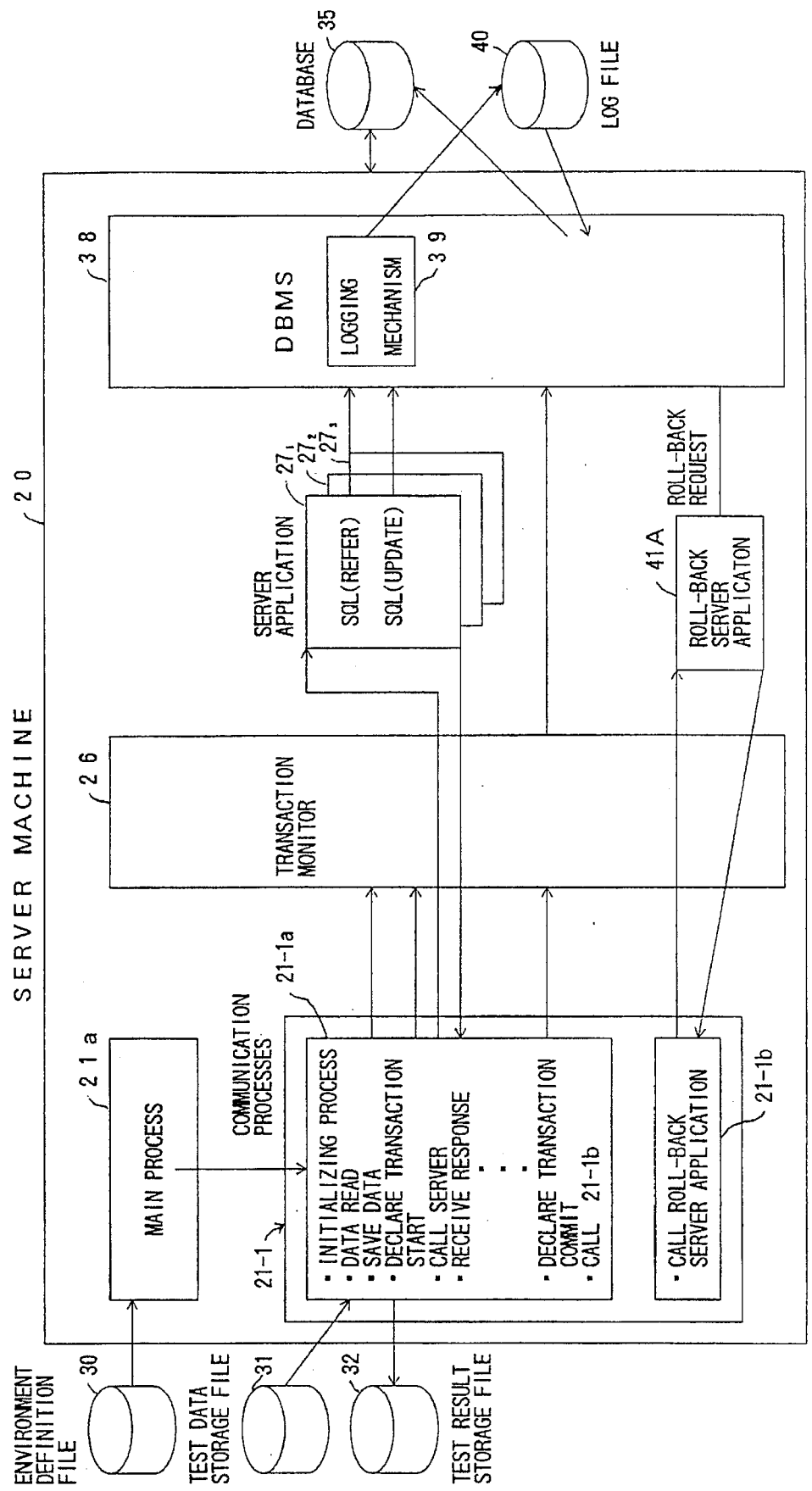
FIG. 9 is a diagram for explaining a third embodiment of the application testing method according to the present invention.

Next, a description will be given of a third embodiment of the application testing method according to the present invention, by referring to FIG. 9. In FIG. 9, those parts which are the same as those corresponding parts in FIG. 7 are designated by the same reference numerals, and a description thereof will be omitted.

In this embodiment, a communication process 21-1, for example, is made up of two communication process units 21-1a and 21-1b. Only one communication process 21-1 is shown in FIG. 9 for the sake of convenience, however, a plurality of communication processes may be provided as in the first and second embodiments described above.

As shown in FIG. 9, the communication process unit 21-1a generally includes two functions in addition to the functions of the communication process $21c_1$ described above, for example. More particularly, the communication process unit 21-1a includes the function of saving the contents of the database 35 immediately before the server application $27_1$ is tested, for example, by making a save request to the DBMS 38. The communication process unit 21-1a also includes the function of calling the communication process unit 21-1b.

The communication process unit 21-1b calls a roll-back application 41A when called by the communication process unit 21-1a. This roll-back application 41A is different from the roll-back application 41 shown in FIG. 7, in that the roll-back application 41A does not make the roll-back by logging the data in the database 35 before the updating into the log file 40. In other words, the data in the database 35 immediately before the server application $27_1$ is tested are saved in the database 35. Hence, in response to the roll-back request from the roll-back application 41A, the DBMS 38 restores the data in the database 35 back to the state immediately before the server application $27_1$ was tested based on the saved data.

Of course, the communication process 21-1 may be made up of three or more communication process units. In addition, not all of the communication processes (only 21-1 shown in FIG. 9) need to be made up of a plurality of communication process units.

Further, the present invention is not limited to these embodiments, but various variations and modifications may be made without departing from the scope of the present invention.

What is claimed is:

1. An application testing method for testing one of a plurality of server applications, the application testing method comprising the steps of:
    (a) providing a database which the plurality of server applications reference and update, using actual data, during normal processing;
    (b) sending, during normal processing, test data to the server application being tested from a client simulator, the test data having the same format as the actual data;
    (c) processing the test data with the server application so as to reference and update the database based on the test data;
    (d) logging a response message from the server application;
    (e) restoring the database to a state prior to step (b) suitable for normal processing by issuing an abort declaration to a translation monitor from the client simulator via a communication process between the transaction monitor and the client simulator;
    (f) repeating steps (b) through (e) for each server application which needs testing.

2. The application testing method as claimed in claim 1, which further comprises the step of:
    (f) testing the server application by logging the test data to be provided to the server application and the response message which is received from the server application into a test result storage file.

3. The application testing method as claimed in claim 2, wherein in the step (e) a communication process which links to one of a transaction monitor and a database management system is generated using reading definition data, the definition data including a name of the server application which is tested and a test result storage file which logs the test data to be notified to the server application and a response message which is received from the server application.

4. The application testing method as claimed in claim 1, wherein the step (e) uses the test data stored in a test data storage file.

5. The application testing method as claimed in claim 1, wherein the step (e) uses the test data given by a terminal.

6. The application testing method as claimed in claim 1, wherein the client simulator is a client application.

7. The application testing method as claimed in claim 1, wherein, in the step (c) the restoring of the database is performed by invalidating the updating of the database so as to restore data within the database to a state before the updating was made.

8. The application testing method as claimed in claim 1, wherein in the step (e) the restoring of the database is performed by making a roll-back request to the database management system from a communication process.

9. The application testing method as claimed in claim 8, wherein the communication process calls a roll-back application and the called roll-back application makes the roll-back request to the database management system.

10. The application testing method as claimed in claim 1, wherein the communication process of the step (e) is performed on a plurality of communication process units at least including first and second communication process units, the first communication process unit performing a step of saving data of the database immediately before the first application is tested, the second communication process unit performing a step of calling a roll-back application which makes a roll-back request to the database management system so as to restore the data of the database to a state prior to step (b) suitable for normal processing.

11. An application testing method for testing one of a plurality of a server applications, the application testing method comprising the steps of:

(a) providing a database which the plurality of server applications reference and update, using actual data, during normal processing;

(b) sending, during normal processing, test data to the server application being tested from a client simulator, the test data having the same format as the actual data;

(c) processing the test data with the server application so as to reference and update the database based on the test data;

(d) logging a response message from the server application;

(e) restoring the database to a state prior to step (b) suitable for normal processing by issuing an abort declaration to a translation monitor from the client simulator via a communication process between the transaction monitor and the client simulator; and (f) repeating steps (b) through (e) for each server application which needs testing;

wherein the communication process of the step (e) is performed on a plurality of communication process units at least including first and second communication process units, the first communication process unit performing a step of saving data of the database immediately before the first application is tested and performing a step of calling the second communication process unit; the second communication process unit performing a step of calling a roll-back application which makes a roll-back request to the database management system so as to restore the data of the database to a state prior to step (b) suitable for normal processing.

\* \* \* \* \*

UNITED STATES PATENT AND TRADEMARK OFFICE
CERTIFICATE OF CORRECTION

PATENT NO. : 5,642,504
DATED : June 24.1997
INVENTOR(S) : Koichi Shiga

It is certified that error appears in the above-identified patent and that said Letters Patent is hereby corrected as shown below:

Delete columns 1-8 and substitute columns 1-8 as per attached.

METHOD OF TESTING AN APPLICATION ON A SERVER WHICH ACCESSES A DATABASE

BACKGROUND OF THE INVENTION

The present invention generally relates to application testing methods, and more particularly to a server application testing method for testing a server application which makes an access to a database.

Tests of a server application, which makes a distributed transaction, may be generally categorized into the following two categories.

1) Testing a calling interface between a client application and the server application; and 2) Testing a database referring and updating process.

A conventional test support function tests test category 1), but does not perform testing under test category 2).

Figure 1:
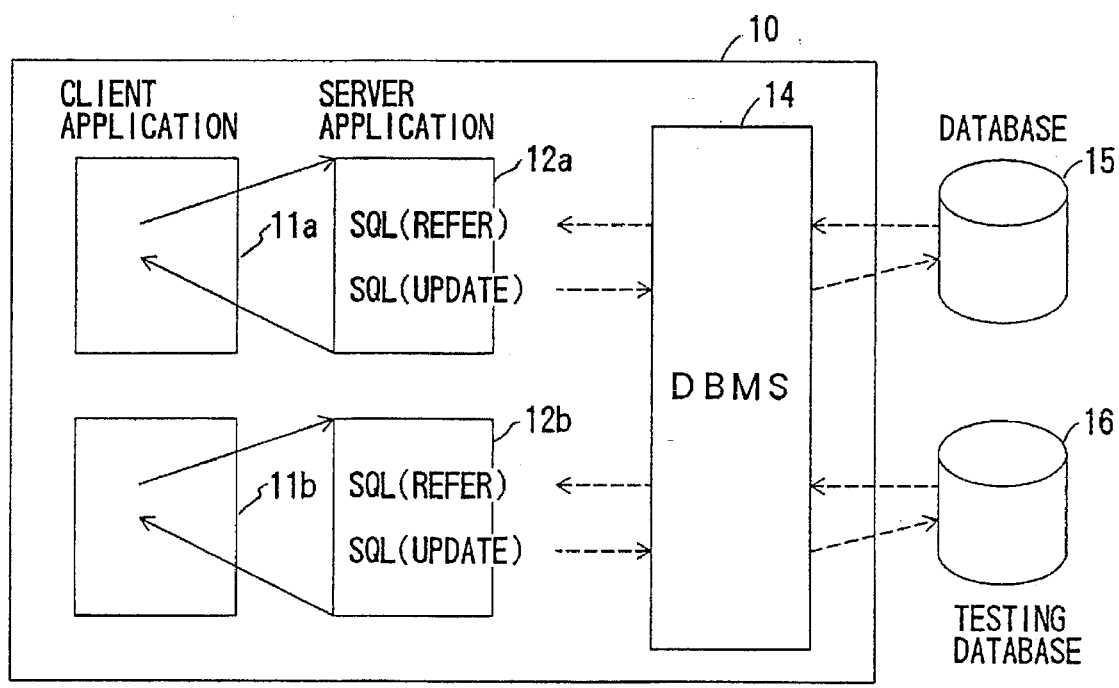
FIG. 1 is a system block diagram for explaining an example of a conventional server application testing method.

For this reason, in order to make the test with respect to the test category 2) above, a testing client application $11b$ and a tested server application $12b$ are provided within a server machine 10, as shown in FIG. 1, in addition to a client application $11a$ and a server application $12a$, which are operational. A database processing instruction (SQL), issued by the server application $12a$, refers to and updates a practical database 15 via a database management system (DBMS) 14. On the other hand, a database processing instruction (SQL), issued by the tested server application $12b$, refers to and updates a testing database 16 by the DBMS 14.

Conventionally, in order to test the server application $12a$, a syntax check of the database processing instruction (SQL), issued by the tested server application $12b$, must be carried out via the DBMS 14. Hence, in order to prevent the practical database 15 from being updated by the execution of the tested server application $12b$, it is necessary to provide a testing client application $11b$ and a testing database 16 for each test of the server application $12a$. As a result, the test efficiency of the conventional server application testing method is poor.

SUMMARY OF THE INVENTION

Accordingly, it is a general object of the present invention to provide a novel and useful application testing method in which the problem described above is eliminated.

Another and more specific object of the present invention is to provide an application testing method for testing a first application which is written in a language which makes reference to and updates a database, comprising the steps of (a) giving test data to the first application by a capacity of a second application which issues a request, and (b) invalidating updating of the database made by the first application by a communication process which links to a transaction monitor or a database management system. According to the application testing method of the present invention, it is possible to test the first application without the need to provide a testing database. In other words, since the updating of the database that is made when the first application is tested is invalidated by the communication process, it is possible to use the practical database for the testing, without the need to provide the testing database. In addition, because the communication process can be generated automatically by a main process, the creator of the first application does not need to prepare a testing client application.

Other objects and further features of the present invention will be apparent from the following detailed description when read in conjunction with the accompanying drawings.

BRIEF DESCRIPTION OF THE DRAWINGS

FIG. 1 is a block diagram of a conventional server application testing method;

FIG. 2 is a block diagram of a server machine;

FIG. 3 is a block diagram of a first embodiment of an application testing method according to the present invention;

FIG. 4 is a flow chart for explaining a main process;

FIGS. 5(A) and (B) are diagrams showing the contents of an environment definition file and test data;

FIG. 6 is a flow chart for explaining a communication process;

FIG. 7 is a block diagram of a second embodiment of the application testing method according to the present invention;

FIG. 8 is a flow chart for explaining a communication process; and

FIG. 9 is a diagram of a third embodiment of the application testing method according to the present invention.

DESCRIPTION OF THE PREFERRED EMBODIMENTS

FIG. 2 is a block diagram of a server machine, and FIG. 3 is a block diagram of a first embodiment of an application testing method according to the present invention.

In FIG. 2, a server machine 20 is provided with a client simulator 21 for simulating a client application. The client simulator 21 includes a definition data analyzer 22 for reading an environment definition file 30 and analyzing definition data, a communication process generator 23 for generating a communication process depending on the analysis result obtained by the definition data analyzer 22, a test data analyzer 24 for analyzing test data read from a test data storage file 31 by the communication process, and a response data storage 25 for writing to a test result storage file 32 a response message which is obtained from a tested server application 27 by carrying out a test.

A transaction monitor 26 manages and controls transactions, which are controlled by a database management system (DBMS) 28 as local transactions. A server application 27, which is to be tested, issues a data processing instruction (SQL) to the DBMS 28 and makes a reference to and updates the contents of a practical database 35.

The DBMS 28 has a provisional updating function for provisionally updating the database 35 prior to the actual updating. After the provisional updating, the DBMS 28 makes the actual updating in response to a commit instruction from the transaction monitor 26, and invalidates the provisional updating in response to an abort instruction.

A main process $21a$, shown in FIG. 3, corresponds to the definition data analyzer 22 and the communication process generator 23, as shown in FIG. 2. In addition, communication processes $21b_1$ through $21b_3$, shown in FIG. 3, correspond to the test data analyzer 24 and the response data storage 25, as shown in FIG. 2.

FIG. 4 shows a main process $21a$ which is started in response to a command which starts the client simulator 21.

In a step S1, the definition data from the environment definition file 30, which is specified by an operand of a start command, is read. As shown in FIG. 5(A), the environment definition file 30 stores the definition data related to the operating environment and the operating conditions. A first row of the environment definition file 30 specifies a communication process name. A second row of the environment definition file 30 specifies a tested server application name, and a third row of the environment definition file 30 specifies a communication format, such as a procedure of giving an immediate answer to each question and a series of questions and answers. A fourth row of the environment definition file 30 specifies a full path name of a test data storage file, which is made by the user, and a fifth row of the environment definition file 30 specifies a full path name of a test result file which makes a logging of the test result. A sixth row of the environment definition file 30 specifies a kind of buffer and a buffer size which are required by the transaction monitor 26, and a seventh row of the environment definition file 30 specifies whether to abort or commit the transaction.

The various specifications (or specifying operations) described above are repeated for a number of tested server applications which are to be tested.

Referring once again to FIG. 4, in step S2, a required number of communication processes $21b_1$ through $21b_3$ and the like, depending on the specification made by the environment definition file 30, are generated. In this state, the main process notifies each of the communication processes $21b_1$ through $21b_3$ of the various specifications made by the environment definition file 30, such as the buffer size and the test data storage file name, to be referred by each of the communication processes $21b_1$ through $21b_3$.

Thereafter, in step S3, an end signal, from each of the communication processes $21b_1$ through $21b_3$, is waited for and in step S4 the end signal from the communication processes $21b_1$ through $21b_3$ is received. Then, in step S5, it is determined whether the end signal has been received from all of the communication processes $21b_1$ through $21b_3$. The process returns to step S3 if the decision result in the step S5 is NO, so as to repeat the steps S3 through S5. On the other hand, the process ends if the decision result in step S5 is YES.

FIG. 6 is a flow chart showing a process which is carried out by each of the communication processes $21b_1$ through $21b_3$. In step S11, an initial process, such as requesting buffer acquisition to the transaction monitor 26, is carried out. In step S12 the test data storage file 31, notified by the main process 21a, is read. The test data storage file 31 stores test data in transaction units as shown in FIG. 5(B). In FIG. 5(B), first, second and fourth rows respectively specify a notification message to be notified to the server application which is to be tested. Third and fifth rows respectively specify the reception of the response messages, with respect to the notification messages of the second and fourth rows. A sixth row specifies the end of the transaction.

Referring once again to FIG. 6, in step S13, the transaction monitor 26 is notified of a start of the transaction. Then, in step S14 the notification messages, which are notified to tested server applications $27_1$ through $27_3$, are logged into the test result storage file 32. In step S15, the tested server applications $27_1$ through $27_3$ is called, based on the test data read from the test data storage file 31. Accordingly, the called server applications $27_1$ through $27_3$ issue the data processing instructions (SQLs) to the DBMS 28 to make reference to and update the database 35.

Next, in step S16, the response from the server applications $27_1$ through $27_3$ is waited, and in step S17, the response from the server applications $27_1$ through $27_3$ is received. In step S18, the received response message is logged into the test result file 32. Thereafter, in step S19 it is determined whether there remains a test data to be notified to the server applications $27_1$ through $27_3$. The process returns to the step S14, and the steps S14 through S19 are repeated, if the decision result in step S19 is YES.

On the other hand, if the decision result in step S19 is NO, then in step S20 an abort of the transaction is declared to the transaction monitor 26. As a result, the transaction monitor 26 instructs a roll-back of the database 35 to the DBMS 28, and the DBMS 28 restores the data of the database 35 being processed to the state before the updating.

In step S21, the buffer, for which the acquisition request was made, is returned to the transaction monitor 26. In step S22, the main process 21a is notified of the end of the communication process by sending an end signal, and the process ends.

Therefore, the updating of the database 35, that was made when testing the server applications $27_1$ through $27_3$ by carrying out the communication processes $21b_1$ through $21b_3$, is invalidated by the abort declaration. For this reason, the contents of the database 35 will not be changed by the test, and it is possible to use the practical database 35, without the need to provide a testing database.

In addition, because the communication processes $27_1$ through $27_3$ are generated automatically by the main process 21a, the creator of the server application does not need to make a client application, and the test can be carried out without the knowledge of the transaction instruction of the client application. Furthermore, the testing of the plurality of server applications $27_1$ through $27_3$ can be carried out time-sequentially.

FIG. 7 is a block diagram showing a second embodiment of the application testing method according to the present invention. In FIG. 7, those parts which are the same as those corresponding parts in FIG. 3 are designated by the same reference numerals, and a description thereof will be omitted.

A DBMS 38 is provided within the server machine 20, without the provisional updating function. Instead, the DBMS 38 has a logging mechanism 39 for logging, into a log file 40, a before-update-log which is related to the access, with respect to the database 35, before the updating. The logging mechanism 39 also reads the before-update-log and a logic log, from the log file 40, in server application units. In addition, a roll-back server application 41 is provided in the server machine 20 to restore the contents of the database 35 to the contents before the updating by use of the logging mechanism 39.

The before-update-log stores the contents of the database 35 before the server application is updated in the updated sequence. For example, if the server application changes a content a1 of the database 35 to b1 and a content a2 of the database 35 to b2, the contents a1 and a2 are stored in the log file 40 as the before-update-log. Accordingly, the contents of the database 35 are restored to the state before the updating by writing back (that is, restoring) the contents a2 and a1.

In this case, the main process 21a calls the roll-back server application 41, after receiving the response from the communication processes $21b_1$ through $21b_3$, using the tested server application name as a parameter. In addition, the main process 21a generates communication processes $21c_1$ through $21c_3$ for making the transaction commit declaration in place of the transaction abort declaration.

FIG. 8 is a flow chart showing a process carried out by each of the communication processes $27c_1$ through $27c_3$. In step S13, an initializing process, such as requesting buffer acquisition to the transaction monitor 26, is carried out. In step S32, the test data storage file 31, which is notified from the main process 21a, is read.

In step S33, the transaction monitor 26 is notified of a start of the transaction. In step S34, a logging of the test data, which are notified to the tested server applications $27_1$ through $27_3$, is logged into the test result storage file 32. In step S35, the tested server applications $27_1$ through $27_3$ are called, based on the test data read from the test data storage file 31. Accordingly, the called server applications $27_1$ through $27_3$ issue the data processing instructions (SQLs) to the DBMS 38 to make reference to and update the database 35. In this state, the before-update-log is written into the log file 40.

Next, in step S36, the response from the server applications $27_1$ through $27_3$ is waited for, and in step S37, the response from the server applications $27_1$ through $27_3$ are received. In step S38, the received response message are logged into the test result file 32. Thereafter, in step S39, it is determined whether there remains a test data to be notified to the server applications $27_1$ through $27_3$. The process returns to step S34 and steps S34 through S39 are repeated if the decision result in step S39 is YES.

On the other hand, if the decision result in step S39 is NO, then in step S40 the roll-back server application 41 is called. In this state, the name of the server application which is tested by the communication process is notified as a parameter. As a result, the roll-back server application 41 issues a roll-back request to the DBMS 28 for the tested server application, and the logging mechanism 39 restores the database 35 by reading the before-update-log of the tested server application, which is specified from the log file 40.

Thereafter, in step S41 a transaction commit declaration is made with respect to the transaction monitor 26. Hence, the transaction monitor 26 instructs definiteness of the database 35 to the DBMS 38, and the DBMS 38 makes the contents of the database 35 definite.

In step S42 the buffer, for which the acquisition request was made, is returned to the transaction monitor 26. In step S43 the main process 21a is notified of the end of the communication process by sending an end signal, and the process ends.

Therefore, even if the DBMS 38 does not have a provisional updating function, the updating of the database 35, that was made when testing the server applications $27_1$ through $27_3$ by carrying out the communication processes $21b_1$ through $21b_3$, can be invalidated after the test ends, similarly to the first embodiment, by providing the log file 40 and the roll-back server application 41. For this reason, the contents of the database 35 will not be changed by the test which is carried out, and it is possible to use the practical database 35, without the need to provide a testing database for use in the testing the server applications $27_1$ through $27_3$.

FIG. 9 shows a third embodiment of the application testing method according to the present invention. In FIG. 9, those parts which are the same as those corresponding parts in FIG. 7 are designated by the same reference numerals, and a description thereof will be omitted.

In this embodiment, a communication process 21-1, for example, is made up of two communication process units 21-1a and 21-1b. Only one communication process 21-1 is shown in FIG. 9 for the sake of convenience, however, a plurality of communication processes may be provided as in the first and second embodiments described above.

As shown in FIG. 9, the communication process unit 21-1a generally includes two functions in addition to the functions of the communication process $21c_1$ described above. More particularly, the communication process unit 21-1a includes a function for saving the contents of the database 35 immediately before the server application $27_1$ is tested, for example, by making a save request to the DBMS 38. The communication process unit 21-1a also includes a function for calling the communication process unit 21-1b.

The communication process unit 21-1b calls a roll-back application 41A when called by the communication process unit 21-1a. This roll-back application 41A is different from the roll-back application 41A is different from the roll-back application 41 shown in FIG. 7, in that the roll-back application 41A does not make the roll-back by logging the data in the database 35 before the updating into the log file 40. In other words, the data in the database 35, immediately before the server application $27_1$ is tested, is saved in the database 35. Hence, in response to the roll-back request from the roll-back application 41A, the DBMS 38 restores the data in the database 35 back to the state immediately before the server application $27_1$ was tested based on the saved data.

Of course, the communication process 21-1 may be made up of three or more communication process units. In addition, not all of the communication processes (only 21-1 shown in Fig. 9) need to be made up of a plurality of communication process units.

Further, the present invention is not limited to these embodiments, but various variations and modifications may be made without departing from the scope of the present invention.

What is claimed is:

1. An application testing method for testing one of a plurality of server applications, the application testing method comprising the steps of:
   (a) providing a database which the plurality of server applications reference and update, using actual data, during normal processing;
   (b) sending, during normal processing, test data to the server application being tested from a client simulator, the test data having the same format as the actual data;
   (c) processing the test data with the server application so as to reference and update the database based on the test data;
   (d) logging a response message from the server application;
   (e) restoring the database to a state prior to step (b) suitable for normal processing by issuing an abort declaration to a translation monitor from the client simulator via a communication process between the transaction monitor and the client simulator;
   (f) repeating steps (b) through (e) for each server application which needs testing.

2. The application testing method as claimed in claim 1, which further comprises the step of:
   (f) testing the server application by logging the test data to be provided to the server application and the response message which is received from the server application into a test result storage file.

3. The application testing method as claimed in claim 2, wherein in the step (e) a communication process which links to one of a transaction monitor and a database management system is generated using reading definition data, the definition data including a name of the server application which is tested and a test result storage file which logs the test data to be notified to the server application and a response message which is received from the server application.

4. The application testing method as claimed in claim 1, wherein the step (e) uses the test data stored in a test data storage file.

5. The application testing method as claimed in claim 1, wherein the step (e) uses the test data given by a terminal.

6. The application testing method as claimed in claim 1, wherein the client simulator is a client application.

7. The application testing method as claimed in claim 1, wherein, in the step (c) the restoring of the database is performed by invalidating the updating of the database so as to restore data within the database to a state before the updating was made.

8. The application testing method as claimed in claim 1, wherein in the step (e) the restoring of the database is performed by making a roll-back request to the database management system from a communication process.

9. The application testing method as claimed in claim 8, wherein the communication process calls a roll-back application and the called roll-back application makes the roll-back request to the database management system.

10. The application testing method as claimed in claim 1, wherein the communication process of the step (e) is performed on a plurality of communication process units at least including first and second communication process units, the first communication process unit performing a step of saving data of the database immediately before the first application is tested, the second communication process unit performing a step of calling a roll-back application which makes a roll-back request to the database management system so as to restore the data of the database to a state prior to step (b) suitable for normal processing.

11. An application testing method for testing one of a plurality of a server applications, the application testing method comprising the steps of:

(a) providing a database which the plurality of server applications reference and update, using actual data, during normal processing;

(b) sending, during normal processing, test data to the server application being tested from a client simulator, the test data having the same format as the actual data;

(c) processing the test data with the server application so as to reference and update the database based on the test data;

(d) logging a response message from the server application;

(e) restoring the database to a state prior to step (b) suitable for normal processing by issuing an abort declaration to a translation monitor from the client simulator via a communication process between the transaction monitor and the client simulator; and (f) repeating steps (b) through (e) for each server application which needs testing;

wherein the communication process of the step (e) is performed on a plurality of communication process units at least including first and second communication process units, the first communication process unit performing a step of saving data of the database immediately before the first application is tested and performing a step of calling the second communication process unit; the second communication process unit performing a step of calling a roll-back application which makes a roll-back request to the database management system so as to restore the data of the database to a state prior to step (b) suitable for normal processing.

\* \* \* \* \*

Signed and Sealed this

Sixteenth Day of June, 1998

Attest:

BRUCE LEHMAN

*Attesting Officer*     Commissioner of Patents and Trademarks